United States Patent
Piety et al.

(10) Patent No.: US 6,189,384 B1
(45) Date of Patent: Feb. 20, 2001

(54) ROUTE BASED ULTRASONIC MONITORING SYSTEM

(75) Inventors: Kenneth R. Piety; William S. Johnson, both of Knoxville, TN (US)

(73) Assignee: CSI Technology, Inc., Wilmington, DE (US)

( * ) Notice: Under 35 U.S.C. 154(b), the term of this patent shall be extended for 0 days.

(21) Appl. No.: 09/073,276

(22) Filed: May 5, 1998

(51) Int. Cl.[7] ................................................. G01H 17/00
(52) U.S. Cl. ................................ 73/592; 73/649; 73/659; 73/660; 73/661
(58) Field of Search ............................. 73/649, 658, 659, 73/660, 661, 40.5 A, 584, 592

(56) References Cited

U.S. PATENT DOCUMENTS

| | | | |
|---|---|---|---|
| 4,520,674 | * | 6/1985 | Canada et al. ................. 73/660 |
| 4,612,620 | * | 9/1986 | Davis et al. .................... 73/660 |
| 5,311,562 | * | 5/1994 | Palusamy et al. ............. 376/215 |
| 5,445,026 | * | 8/1995 | Eagan ............................ 73/40.5 A |
| 5,650,943 | * | 7/1997 | Powell et al. ................. 73/40.5 A |

* cited by examiner

Primary Examiner—Hezron Williams
Assistant Examiner—Rose M. Miller
(74) Attorney, Agent, or Firm—Luedeka, Neely & Graham, P.C.

(57) ABSTRACT

A route based ultrasonic monitoring method for use by an operator in detecting when the ultrasonic sound produced by a device indicates the presence of a leak or machinery defect. The route based ultrasonic monitoring method uses a central processing location to store testing information concerning which machines to test and how to configure a portable ultrasonic sensing device to test them. At the appropriate time, the testing information is loaded from the central processing location into the portable processing and storage unit. The operator is then prompted by the portable processing and storage unit to proceed to a test location. Once at the test location, the portable processing and storage unit provides the testing information to the portable ultrasonic sensing device. The test is then performed by the operator with the portable ultrasonic sensing device and the test results are downloaded from the portable sensing device to the portable processing and storage unit. Once all the tests along a particular route of testing locations have been performed, the test results are downloaded from the portable processing and storage unit to the central processing location. The results of the most current set of tests are then compared to the results of previous tests to determine the presence of any machinery defects.

30 Claims, 8 Drawing Sheets

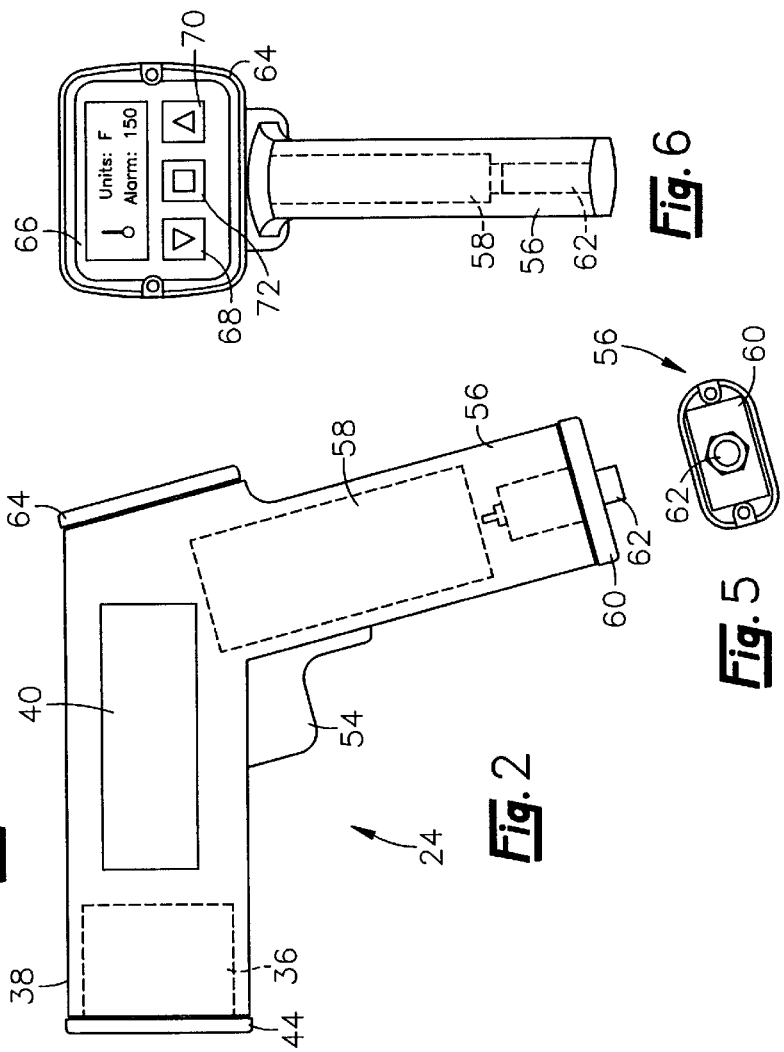

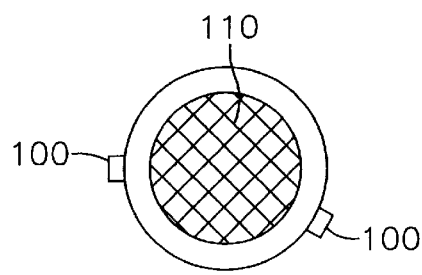
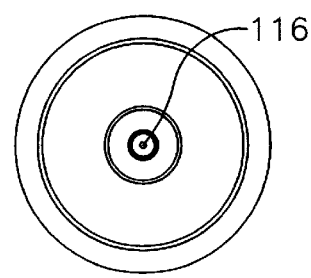
*Fig.* 9B
*Fig.* 10B
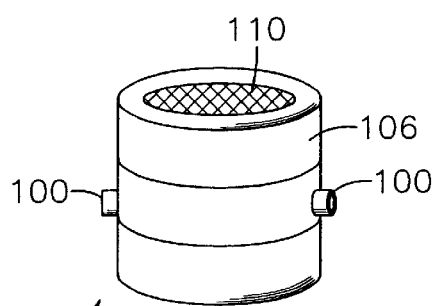
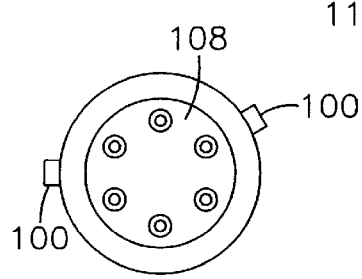
*Fig.* 9A
*Fig.* 10C
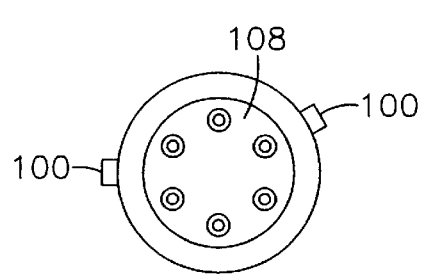
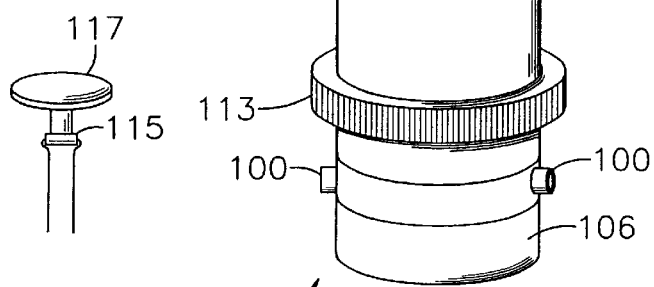
*Fig.* 9C
*Fig.* 10D
*Fig.* 10A
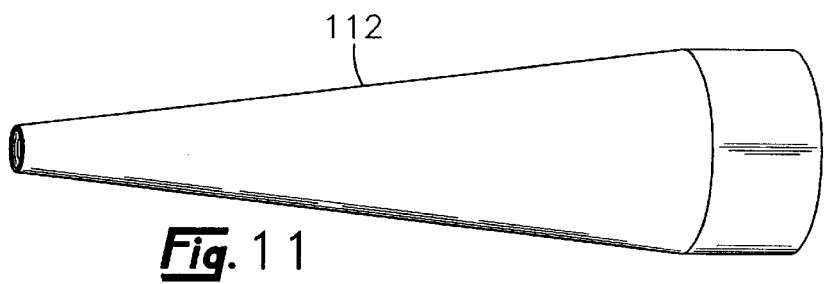
*Fig.* 11

ROUTE BASED ULTRASONIC MONITORING SYSTEM

BACKGROUND

FIELD OF THE INVENTION

In general, the present invention relates to a method of detecting and monitoring ultrasonic waves. In particular, the present invention relates to a route based method of monitoring equipment that utilizes a central base computer and a portable ultrasonic monitoring instrument to analyze and store information about detected ultrasonic waves and surface temperatures in order to locate leaks and machinery defects.

BACKGROUND OF THE INVENTION

The normal frequency range for human hearing is roughly 20 to 20,000 hertz. Ultrasonic sound waves are sound waves that are above the range of human hearing and, thus, have a frequency above about 20,000 hertz. Any frequency above 20,000 hertz may be considered ultrasonic. Most industrial processes, including almost all sources of friction, create some ultrasonic noise. For example, leaks in pipes, machinery defects and electrical arcing produce ultrasonic sound waves that have a frequency that is too high for the human ear to detect. In the past, analog ultrasonic sensors have been used in industrial settings to sense these ultrasonic sound waves. To monitor the ultrasonic sound waves produced by operating machinery, an operator would use an ultrasonic sensor to obtain a reading indicating the strength of the ultrasonic sound waves near the machine. If the ultrasonic sound levels generated by one machine were larger than those produced by another similar machine, the operator would investigate further to determine if a problem existed with the noisy machine. If the ultrasonic sound levels were approximately equal to those produced by a properly functioning machine, the operator would assume the machine was properly functioning and simply proceed to the next machine. Some of the prior art ultrasonic sensors used to monitor machines were semi-permanently mounted on individual machines so that ultrasonic readings could be obtained by simply checking the output of the ultrasonic sensors. However, other ultrasonic detectors were portable to allow the operator to monitor many machines. These portable ultrasonic detectors were especially useful in locating small leaks in pipes carrying pressurized gasses. Because ultrasonic sound waves attenuate very rapidly, the location of the sound waves is usually the location of the leak. Therefore, in order to locate a leak, the user simply moved the ultrasonic detector over the surface until the strength of the ultrasonic sound waves rapidly increased. The user then investigated further by placing soapy water on the location where it was suspected that there was a leak. If a leak was present, bubbles would form in the soapy water where the gas was escaping.

These analog ultrasonic instruments suffer from many drawbacks. For example, the analog instruments do not provide a quantitatively referenced power level of the signal to the user. Instead, the analog ultrasonic units simply provide a relative indication of the ultrasonic sound waves' strength in one location compared to another location. Typically, this information is provided to the user by a needle on a dial with an adjustable volume. The volume is set so that the needle is at a reference point when an ultrasonic measurement is taken in a particular location. If the needle rises above that point when a reading is taken in another location, the ultrasonic noise level is higher at the second location than the reference point and vice versa. This is undesirable because it makes it difficult to compare readings taken at one point in time to readings taken at a later point in time. Also, prior art analog instruments did not employ analog to digital converters or microprocessors, making it difficult for them to perform advanced signal analysis techniques on the ultrasonic electrical signals.

SUMMARY OF THE INVENTION

The present invention eliminates the oversights, difficulties, and disadvantages of the prior art by providing an automated route based ultrasonic monitoring system and method for use in detecting ultrasonic signals. The route based method monitors a mechanical system with a monitoring system that includes a portable sensing device, a portable processing and storage unit, and a central processing location.

In accordance with the method, a list is created that contains the location of each machine or device to be tested, the tests to be performed on each machine or device, and the times at which the tests should be performed. The list is stored in the central processing location. In order to keep accurate records of the tests to be performed and the results of the tests, each machine to be measured and each measurement to be taken is assigned an identification code. The identification code is stored in the central processing location for later reference. Alarm levels indicating conditions that may require immediate attention are determined for each measurement taken. When the time arrives to perform the tests, a list of the tests that currently need to be performed, the alarm levels for each measurement and the configuration information needed to perform the list of tests are loaded into the portable processing and storage unit from the central processing location. The operator of the system is then prompted to proceed to a first measurement location with the portable sensing device and the portable processing and storage device. Instructions concerning the particular types of tests to be performed at the first measurement location are provided to the operator. The configuration information related to the performance of the particular tests and the alarm levels for the tests are provided from the portable storage and processing unit to the portable sensing means. Thus, the system eliminates the need for the operator to keep track of any special settings needed to most accurately monitor a particular machine.

When the device is properly configured, the tests are performed with the portable sensing device and the test results are obtained. At a convenient time, the test results are downloaded from the portable sensing device to the portable processing and storage unit. Once a test has been performed, the operator is prompted to proceed to the next measurement location along the route of testing locations and perform the tests indicated by the portable processing and storage device. The operator continues to perform the tests indicated by the portable processing and storage device in the manner described above until all of the tests on the list of tests have been performed. The test results stored in the portable processing and storage unit are transferred to the central processing station where they can be stored and analyzed The test results from the most current set of measurements may then be compared to the stored test results from any previous measurements to determine if any trends in the data indicate a condition that warrants further investigation.

The above described method overcomes the disadvantages of the prior art by providing an automated method for monitoring a set of machines producing ultrasonic sound. By automatically configuring the devices in the same manner each time a test is performed and consistently providing detailed information to an operator on how to best perform the test, the method allows the results of tests performed at different times to be reliably compared. Furthermore, the automatic storing and retrieving of data saves time and money over the prior art approach of manually recording test results.

In accordance with a preferred method of the present invention, an improved method of diagnosing mechanical defects or leaks producing ultrasonic sound is provided. A set of instructions for performing the series of measurements is stored and an operator is directed along a route of measurement points. The set of instructions are provided to the operator at appropriate times. Thus, the operator is provided information concerning the type of measurements to be taken and the manner in which the measurements should be taken. The operator is then prompted to perform the series of measurements along the route of measurement points to obtain a set of results. Because some test results may warrant immediate attention, a set of alarm levels is provided for the series of measurements. Preferably the series of measurements provide information concerning the level of ultrasonic sound and the temperature at various locations. The results of the set of measurements are visually and/or audibly displayed to the operator The set of results is then stored and the operator is provided the location of the next test to perform. The set of results from the series of measurements may be compared to a set of results from a previous series of measurements along the route of measurement points in order to determine if any trends in the set of results indicate the presence of a machine defect or leak.

Yet another route based method of monitoring equipment failures, such as leaks or machinery defects that produce ultrasonic sound waves, stores test information concerning the type and location of the tests to perform in a centrally based storage system. A portion of the test information is loaded into a portable testing device. Preferably, this information includes configuration information and alarm levels. The operator is then prompted to perform a test that generates test results with the portable testing device. For the time being, the test results are stored in the portable testing device. Later, the test results are transferred from the portable testing device to a centrally based storage system. A series of tests are performed on a particular piece of equipment over a period of time to obtain a series of test results. These results can be processed to identify trends in the series of test results that may indicate a potential equipment failure. Thus, equipment failures are diagnosed by comparing the test results of a most recent test to the test results of a previous test. Likewise, the alarm levels for a piece of equipment may be calculated based on the test results received from a prior test performed on the piece of equipment and when to perform another test on a piece of equipment may be determined based on the previous results of tests performed on the piece of equipment.

In accordance with a particularly preferred method of monitoring the condition of a plurality of pieces of equipment producing ultrasonic sounds, a list of the location of each piece of equipment to be monitored and the times at which the piece of equipment should be monitored is compiled and an operator is prompted to monitor the pieces of equipment at the appropriate times. The amount of ultrasonic sound produced by each piece of equipment at a first time is measured and recorded. The amount of ultrasonic sound produced by each piece of equipment at a second time is then measured and recorded. The amount of ultrasonic sound produced by each piece of equipment at the first time is compared with the amount of ultrasonic sound produced at the second time to determine the condition of the piece of equipment. In addition, the temperature of a piece of equipment is measured and recorded at a first time and a second time and the temperature at the first time is compared to the temperature at the second time to determine the condition of the equipment. A temperature alarm level at which a temperature alarm will be generated is determined and a temperature alarm is generated when the temperature alarm level is exceeded. The temperature alarm level is based on a previous temperature that was measured and recorded for the piece of equipment. Ultrasonic alarm levels are generated for a piece of equipment and an ultrasonic alarm signal is produced when the ultrasonic sound produced by the piece of equipment exceeds the ultrasonic alarm levels. The ultrasonic alarm levels are generated based on the amount of ultrasonic sound previously measured and recorded for a piece of machinery.

Other objects, features and advantages of the present invention will become apparent by reference to the following detailed description when considered in conjunction with the accompanying drawings.

BRIEF DESCRIPTION OF THE DRAWINGS

In the drawings below, like reference characters refer to like parts throughout the several views, and wherein.

FIG. 2 is a side view of the elongate housing that shows the locations of the main internal components;

FIG. 3 is a front view of the elongate housing that shows the bottom of the sensor socket;

FIG. 4 is a bottom view of the barrel shaped portion of the elongate housing that shows the location of the input and output ports.

FIG. 5 is a bottom view of the grip portion of the elongate housing showing the headphone jack;

FIG. 6 is a rear view of the elongate housing that shows the display and user input keys;

FIGS. 9a, 9b, and 9c are pictorial representations of an airborne sensor;

FIGS. 10a, 10b, 10c, and 10d are pictorial representations of a contact sensor;

FIG. 11 is a pictorial representation of a focusing cone;

DESCRIPTION OF THE PREFERRED EMBODIMENT(S)

The ultrasonic monitoring system of the present invention effectively locates leaks of air, steam, or other gases from pressurized systems as well as arching and electrical corona, which may produce ultrasonic sounds. Furthermore, the ultrasonic monitoring system can also diagnose and analyze steam trap operation, bearing and gear defects, cavitation and surging in pumps and compressors, lubrication problems in dynamic equipment, valve operation, steam lines, and piston friction and detonation problems in reciprocating equipment.

Figure 1:
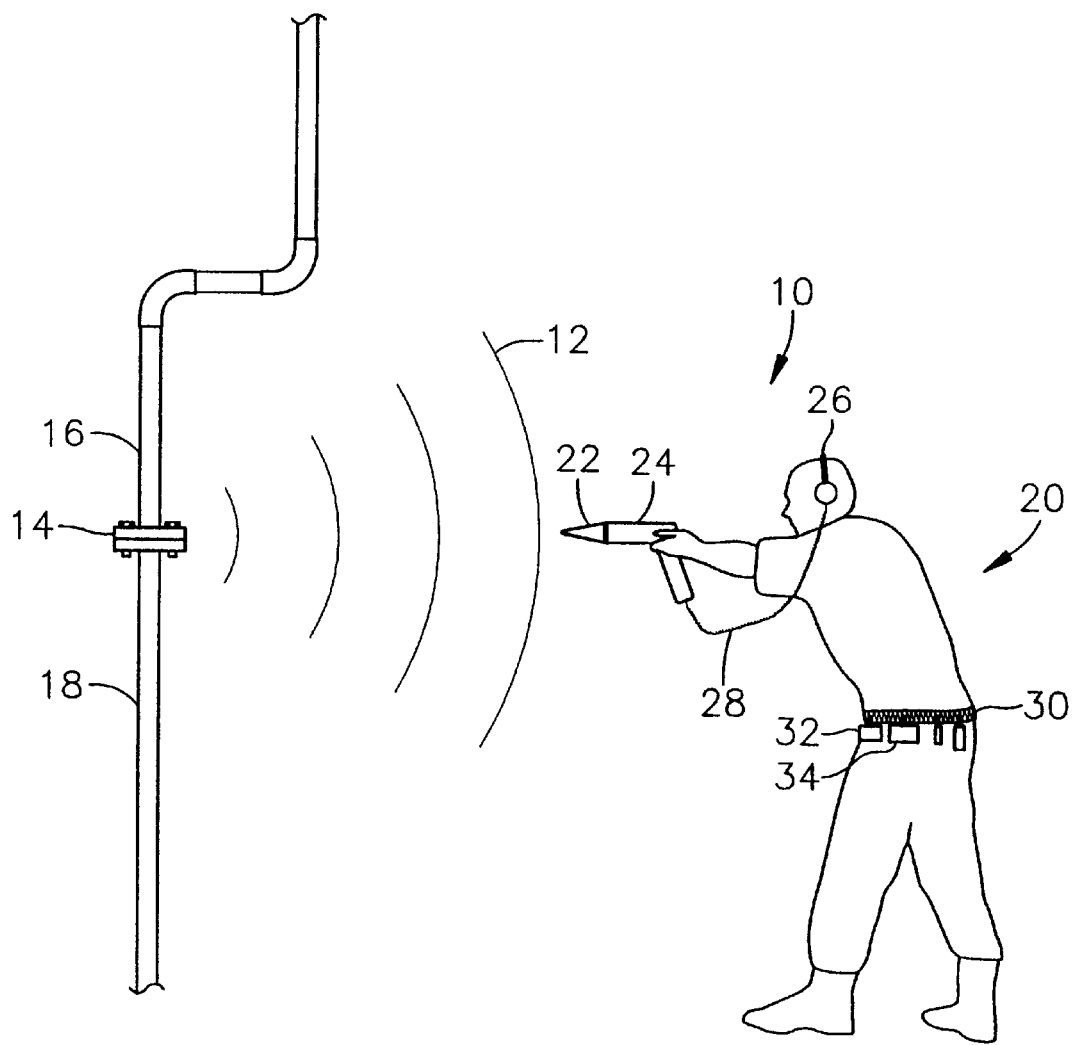
FIG. 1 is a perspective view of an operator using the ultrasonic monitoring system of the present invention.

Referring now to FIG. 1, an especially preferred ultrasonic monitoring system 10 for detecting and monitoring ultrasonic sound waves 12 is shown. The ultrasonic sound waves 12 are emanating from the intersection 14 of two abutting pipes 16 and 18. In the case of leak detection, the ultrasonic monitoring system 10 is principally used by the operator 20 to determine the location from which the ultrasonic sound waves 12 are emanating. The ultrasonic monitoring system 10 consists of an ultrasonic sensor 22 mounted in a portable elongate housing 24. In operation, the elongate housing 24 is held by the operator 20 and pointed toward a machine or device that might contain a leak or defect that is radiating ultrasonic sound waves 12. A pair of headphones 26 are worn by the operator 20 and attached to the elongate housing 24 via a cord 28. The operator 20 of the ultrasonic monitoring system 10 receives an audible signal the volume of which indicates the relative strength of the ultrasonic sound waves 12 being received by the sensor 22 located in the barrel of the elongate housing 24 through the pair of headphones 26. When the elongate housing 24 and the sensor 22 are pointed away from the source 14 of the ultrasonic sound waves 12, the strength of the ultrasonic sound waves 12 detected by the sensor 22 decreases. When the elongate housing 24 and the sensor 22 are pointed toward the source 14 of the ultrasonic sound waves 12, the strength of the ultrasonic sound waves 12 detected by the sensor 22 increases. This increase and decrease in the detected ultrasonic sound wave strength can be audibly represented in a variety of fashions. For example, a rise in the volume of a tone produced by the ultrasonic monitoring system 10 could indicate the detected ultrasonic sound waves are growing stronger and a fall in the volume of the tone could indicate the sound waves are growing weaker. A rise and fall in the pitch of the tone could also indicate a respective rise and fall in the strength of the detected ultrasonic sound waves. Alternatively, a Geiger counter type clicking would also serve the function of indicating the strength of the detected sound waves to the user 20 of the ultrasonic monitoring system 10. However, in a most preferred embodiment, the ultrasonic sound waves 12 received by the sensor 22 are heterodyned to produce related electrical signals that have a frequency in the audible range of humans. These related signals have many of the distinctive properties of the ultrasonic sound waves 12 from which they were produced. Providing these related electrical signals to the headphones 26 allows the operator 20 to identify the type of noise source radiating the ultrasonic sound waves 12 by listening to the distinctive noise signals created by different types of ultrasonic sound wave sources.

The ultrasonic sound waves 12 received by the sensor 22, or the data derived from the ultrasonic electrical signals produced by the sensor 22, are preferably stored in a microprocessor based system 32, which is releasably secured to the operator 20. The microprocessor based system 32 is used to store and analyze the data collected by the ultrasonic monitoring system 10, provide testing information to the operator 20 and prompt the operator 20 to take measurements from particular locations. As discussed in greater detail below, the microprocessor based system 32 in a preferred embodiment is a portable personal computer or personal data assistant. The microprocessor based system 32 is secured to the operator 20 via a utility belt 30. The utility belt 30 also has a holster for receiving the elongate housing 24, pockets for accessories such as small tools, tags, survey tape and soap solutions, and an ultrasonic sound wave transmitter and charger 34.

The elongate housing 24 contains many of the components needed to implement an ultrasonic monitoring device 10 in accordance with the present invention. The preferred internal location of these components inside the elongate housing 24 is shown in FIG. 2. A sensor socket 36 is located in the barrel portion 38 of the elongate housing 24. The sensor socket 36 is designed to receive a variety of different sensors 22. When a sensor 22 is installed in the sensor socket 36, the sensor socket 36 provides electrical contact between the installed sensor 22 and a microprocessor based control circuit 40 also located in the barrel portion 38 of the elongate housing 24.

As shown in FIG. 3, the electrical contacts between the sensor 22 and the sensor socket 36 are provided by a series of electrical contacts 42 located in the sensor socket 36. In an especially preferred embodiment, the electrical contacts 42 consist of six spring biased pins 42 that create an electrical connection between the pins 42 and corresponding contact pads 108 located on the base of the sensors 22. The sensor socket 36 is surrounded by a plate 44 that covers and protects the front of the barrel portion 38 of the elongate housing 24.

The microprocessor based control circuit 40 is internally contained in the barrel portion 38 of the elongate housing 24. Preferably, the microprocessor 78 in the microprocessor based control circuit 40 is a sixteen bit Toshiba microprocessor having model number TMP93CS41F. The microprocessor based control circuit 40 also preferably contains a RAM chip that is 256K×8 bits and a flash memory that is 64K by 8 bits. The microprocessor based control circuit 40 can communicate to external devices by means of several input and output ports located on the lower portion of the barrel 38 of the elongate housing 24. As shown in FIG. 4, an RS 232 port 46 is located on the lower portion of the barrel 38. In addition to the RS 232 port 46, an infrared communications port 48 is also located on the lower portion of the barrel 38 beneath the sensor socket 36 and provides the microprocessor control circuit 40 the ability to establish wireless communication with an external device. Preferably, the infrared communications port 48 is a low-voltage infrared receiver manufactured by Texas Instruments under Model No. TIR1000. Additionally, a signal output port 50 is located near the RS 232 port 46 and the infrared communications port 48. The signal output port 50 provides a signal that is the detected envelope waveform of the ultrasonic electrical signal. The detected envelope waveform signal consists of any instantaneous point on the detected waveform having a DC value directly related to the signal strength in decibels at that point. This signal output may be provided to a machine analyzer so that frequency and time domain analysis can be performed on the ultrasonic envelope waveform. The final port shown in FIG. 4 is a battery charger jack 52 that is used to receive the DC voltage source that charges the rechargeable power supply 58.

Referring back to FIG. 2, a trigger 54 for activating the ultrasonic monitoring system 10 is located at the junction of the barrel portion 38 and the grip portion 56 of the elongate housing 24. The trigger 54 is positioned similar to a trigger on a real pistol and is electrically connected to the microprocessor control circuit 40. When the trigger 54 is pressed, the ultrasonic monitoring system 10 begins collecting data. When the trigger 54 is released, the system 10 ceases collecting data. Thus, the trigger 54 simply functions as an activation switch and it is understood that there are alternative manners in which this function could be implemented.

The electrical components of the ultrasonic monitoring system 10 contained in the elongate housing 24 are powered by a rechargeable power supply 58 that is mounted in the grip portion 56 of the elongate housing 24. As previously discussed, the rechargeable power supply 58 is recharged by a way of a battery charger jack 52 which is located next to the signal output port 50. A standard adapter having a first end for plugging into a common electrical outlet and a second end for engaging port 52 provides power to the battery charger jack 52. A headphone jack 62 located on the bottom portion of the grip 56 extends through the handle plate 60 of the elongate housing 24. The headphone jack 62 provides signals to the headphones 26 through a removable cord 28 that is electrically connected to the headphones 26. Alternatively, wireless headphones may be incorporated into the present invention. FIG. 5 is a view of the bottom of the grip 56 that clearly shows the headphone jack 62 and the handle plate 60.

FIG. 6 shows the rear plate 64 of the elongate housing 24 that contains the display 66 that is viewed by the operator 20 when ultrasonic data measurements are being taken. The display 66 is mounted in the rear plate 64 and provides visual ultrasonic data indicators and operational information to the operator 20 of the ultrasonic monitoring system 10. The display 66 is preferably a 2×12 character matrix liquid crystal display. A down arrow user input key 68, an up arrow user input key 70 and a mode user input key 72 are located below the display 66. The grip 56, the headphone jack 62 and the internal rechargeable power supply 58 are also shown in FIG. 6.

Figure 7A:
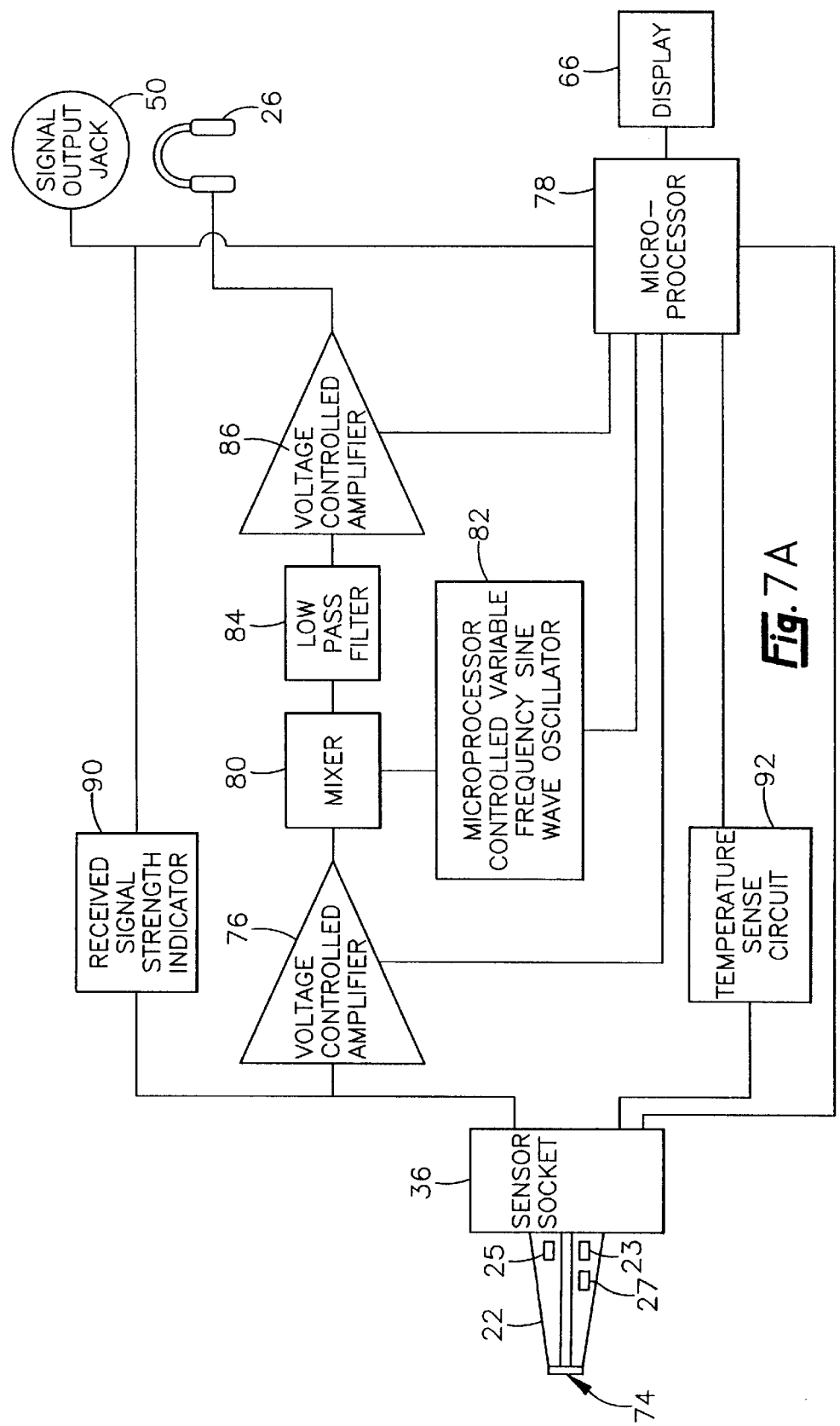
FIG. 7a is a block diagram of the electronics contained in the elongate housing.

The functioning of the electrical components inside the elongate housing 24 can better be understood by examining a block diagram of the components. The embodiment shown in FIG. 7a has a ultrasonic sensor 22 with an integral temperature sensor 74 installed in the sensor socket 36. In a preferred embodiment, the temperature sensor 74 is coaxially mounted inside the cavity of the ultrasonic sensor 22. The ultrasonic sensor 22 with the integral temperature sensor 74 provides ultrasonic electrical signals to the electrical contacts 42 in the sensor socket 36. The sensor socket 36 provides the ultrasonic electrical signal that is related to the strength of the ultrasonic sound waves 12 received by the ultrasonic sensor 22 to a first voltage controlled amplifier 76. The amount of amplification provided by the first voltage controlled amplifier 76 is controlled by a microprocessor 78. After being amplified, the amplified ultrasonic electrical signal is sent to a mixer 80. The mixer 80 mixes the amplified ultrasonic electrical signal with an oscillation signal provided by a microprocessor controlled variable frequency sine wave oscillator 82 to produce a signal that is related to the original ultrasonic electrical signal produced by the ultrasonic sensor 22. This signal consists of at least: (1) the amplified ultrasonic electrical signal; (2) the oscillator signal; (3) the frequency sum of the ultrasonic electrical signal and the oscillator signal; and (4) the frequency difference of the ultrasonic electrical signal and the oscillator signal. The signal output from the mixer 80 is passed through a low pass filter 84 to remove any high frequency components above the audible frequency range of a human being. This filtered signal is then sent to a second voltage controlled amplifier 86 that is controlled by the microprocessor 78. Finally, the amplified and filtered signal is sent to the headphones 26 where it is broadcast to the operator 20. The point is to create a signal that can be heard by humans and is related to the ultrasonic electrical signals in a manner that allows the operator 20 to distinguish between different ultrasonic electrical signals by distinguishing between the different mixed signals. The second voltage controlled amplifier 86 is essentially a volume control for the head phones 26.

An advantage of the ultrasonic monitoring system 10 of the present invention is that there are two signal paths for the ultrasonic electric signals produced by the ultrasonic sensor 22. As discussed above, one signal path provides an audio output that can be listened to by the operator 20 of the ultrasonic monitoring system 10. However, the ultrasonic electrical signal received from the ultrasonic sensor 22 is also sent to a received signal strength indicator 90. The received signal strength indicator 90 is a functional part of a Philips Semiconductor RF Communications Products Model SA637 low-voltage IF receiver. This received signal strength indicator produces an envelope waveform of the ultrasonic electrical signal consisting of instantaneous points on the waveform having a DC value related to the signal strength in decibels of the ultrasonic electrical signal at that point.

Figure 7B:
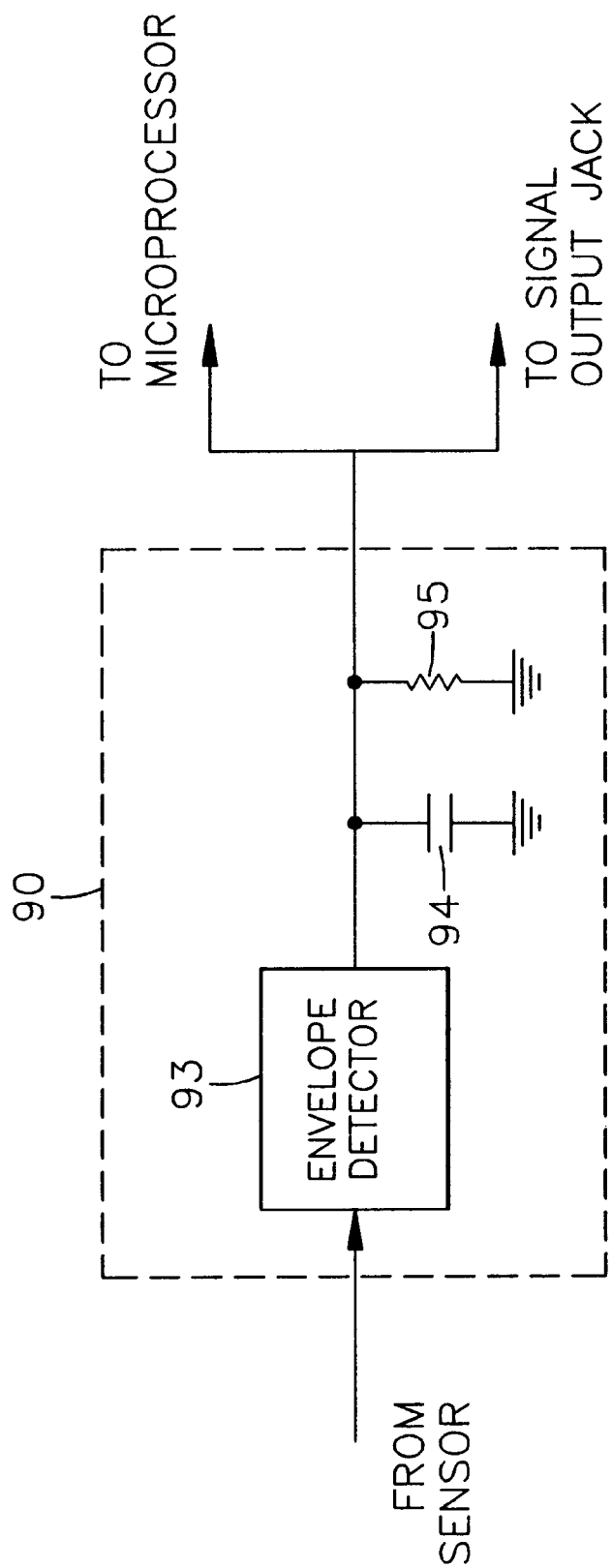
FIG. 7b is a block diagram of an embodiment of a received signal strength indicator.

Referring now to FIG. 7b, an embodiment of the received signal strength indicator 90 is depicted. The signal from the sensor is received by an envelope detector 93. A capacitor 94 and a resistor 95 provide the envelope detector 93 with a rapid rise and slow decay output. In an especially preferred embodiment, the envelope detector 93 is provided with a response time constant of approximately 60 microseconds. The time constant is selected to substantially eliminate the intrinsic ultrasonic frequency signals while allowing any dynamic amplitude variations in those signals to be sent to microprocessor 78. The same signal is also provided to output jack 50. Sampling of this envelope waveform allows the microprocessor 78 to calculate a referenced decibel level of the ultrasonic sound waves at substantially any point in time. The referenced decibel level is determined by comparing the measured signal amplitude against a stored look up table of calibration values, a zero decibel value being referenced to an acoustic sound pressure level of 20 microPascals (0.0002 microBars) in an especially preferred embodiment.

The aforementioned envelope detection process could be referred to as a peak follower technique or, when used in conjunction with a filtering time constant, as a form of demodulation. In addition, the envelope detection process may be combined with an analog sample and hold circuit, or, in an especially preferred embodiment, with an analog to digital converter. The technique provides an energy waveform of periodic bursts or rings that represents the bursts or rings of acoustic vibrations. Depending upon the type of machinery faults generating them, these bursts may have a duration of a few milliseconds or less. The intrinsic frequency of the bursts is relatively high, usually several kHz or higher. In the case of the present invention, 40 kHz is the preferred frequency of operation. The idea is to measure the peak amplitude of the burst or ring frequencies during sample time windows. In general, the intrinsic frequency or frequencies of the bursts are not of interest. It is the signal amplitudes and signal periodicity that are of the greatest interest for analysis. Nevertheless, the technique is still of value with ultrasonic sound waves of constant amplitude and constant duration, as may be the case with a steady leak from a pipe. In the case of a constant amplitude ultrasonic sound wave, the envelope waveform would be a DC value representative of the decibel level of the ultrasonic sound wave.

While we use envelope detection as shown in FIG. 7B, it is expressly understood that the Peak Vue techniques disclosed in U.S. application Ser. No. 08/840,844 filed Apr. 17, 1997 which is a continuation of U.S. application Ser. No. 08/555,296 filed Nov. 8, 1995 and now abandoned may be used in accordance with an embodiment of the present invention. Both techniques perform a peak follower function and are able to capture peak amplitude values of short duration signal bursts or rings. Thus, it would be possible to incorporate the Peak Vue method into the present invention.

Determining a referenced decibel output is a substantial improvement over the prior art method of using an analog instrument to provide a relative indication of the amplitude of the ultrasonic sound produced in one location compared to the ultrasonic sound produced at another location. Because there is no absolute reference for the prior art ultrasonic measurements, it is difficult to compare a current reading to a prior reading taken at some earlier time. Furthermore, the unreferenced readings taken by one particular instrument are difficult to compare to the readings taken by another instrument. However, because the referenced decibel outputs of an instrument constructed in accordance with the present invention are referenced to a known value, the referenced outputs of the present invention may be stored and accurately compared to later readings obtained by other instruments. Thus, providing a referenced output allows measurements taken over an extended period of time to be analyzed to determine if the amount of ultrasonic sound produced by a particular machine is increasing or decreasing.

The output from the integral temperature sensor 74 is provided to the temperature sense circuit 92. The temperature sense circuit 92 supplies a constant current to the temperature sensor 74. The resistance of the temperature sensor 74 is dependent upon its temperature. Thus, the voltage produced by the constant current flowing through the temperature sensor 74 is representative of the temperature sensed by the temperature sensor 74. This voltage is provided to the microprocessor 78 which interprets the voltage as a temperature and sends a temperature reading to the display 66.

The microprocessor 78 uses the signal indicative of the strength of the received ultrasonic sound waves to calculate a number of values. The value calculated by the microprocessor 78 depends upon the mode in which the ultrasonic monitoring system 10 is operating. The operator 20 can select from different operating modes by selecting the operating mode menu with the mode key user input 72 and then scrolling through the mode menu with the up 70 and down 68 arrow input keys. Once an operating mode has been selected by the operator 20, a symbol appears on the display 66 indicating the mode in which the ultrasonic monitoring system 10 is operating.

For example, if the user 20 selects the peak hold mode, the highest input signal level received by the microprocessor 78 from the received signal strength indicator 90 is retained and displayed as long as the trigger 54 remains depressed. When the trigger 54 is released, the peak value of the signal received by the microprocessor 40 is frozen on the display 66. The display 66 and the retained peak value are reset to zero when the trigger 54 is pressed again. Another mode which can be selected is the instantaneous averaging mode. This is the preferred operating mode of the present invention. In this mode, the microprocessor 78 receives the signal indicative of the received ultrasonic electrical signals strength and determines the strength of the ultrasonic sound waves. In a similar fashion to that of the peak hold operating mode, the microprocessor 78 retains and displays the strongest signal received. However, in the instantaneous mode of operation, this value is rapidly reset. Preferably, the display 66 is updated at least three times a second. This allows an almost instantaneous indication of the strength of the ultrasonic sound waves being received by the ultrasonic sensor 22. Yet another mode of operation is the averaged mode. In this mode, the microprocessor 78 calculates and sends to the display 66 an average referenced decibel level of the ultrasonic sound waves received between the time the trigger 54 was pressed and the current time. When the trigger 54 is released, the output is frozen. The decibel level is referenced to an accepted standard, such as zero decibels at an acoustical sound pressure level of 20 micropascals or zero decibels at $50 \times 10^{-12}$ inches peak to peak of mechanical displacement. Still another mode of operation is the peak factor mode of operation. In accordance with this mode, the difference between the peak value of the signal and the average value of the signal is displayed. It is readily appreciated that a number of other values representing various characteristics of the sensed ultrasonic sound waves could be calculated by the microprocessor 78. In fact, one of the primary advantages of using a microprocessor based system is that the manner in which the digital data is analyzed and manipulated can easily be altered without requiring complex design changes. The particular values discussed are simply those of an especially preferred embodiment of the present invention.

The microprocessor 78 also allows an operator of the ultrasonic monitoring system 10 to enter various information concerning the results of the ultrasonic tests for later reference. For example, after the operator has performed a test, the microprocessor 78 can prompt the operator to input information concerning characteristics of the sound produced in the headphones 26 by displaying a message such as "Sounds Like?" on the display 66. The user would then use the up arrow input key 70 and the down arrow input key 68 to scroll through a list of choices such as "buzz","hiss", "crackle","pop","impacting", etc. Once the user has located the proper description, the microprocessor 78 can be instructed to save the description in memory by pressing the mode input key 72. It should be readily understood that a variety of other information could be stored using the above described method.

The ultrasonic sensor 22 and the temperature sensor 74 contain identification information that is read by the microprocessor 78 located in the elongate housing 24. The identification information is sent by an identification circuit 23 in the sensors 22 and 74 to the microprocessor 78. The microprocessor 78 uses the identification information to configure the ultrasonic monitoring system 10 to operate using the type of sensor 22 installed in the sensor socket 36. The identification circuit 23 preferably consist of a memory with a serial output. Preferably, the identification information not only identifies the type and nature of the sensors 22 and 74, but also includes calibration data used by the device 10 to accurately interpret the sensors 22 and 74 signals.

In an especially preferred embodiment, the identification circuit 23 is a DS2502 1 KBIT Add-Only Memory manufactured by Dallas Semiconductor. Alternatively, the identification circuit 23 is a resistor having a resistance value that corresponds to a particular sensor 22 and 74. The microprocessor 78 determines the type of sensor 22 and 74 by determining the value of the resistor. In yet another embodiment, the identification circuit 23 is a bar graph containing visually encoded information that is read by an optical sensor located in the sensor socket 36.

Figure 8A:
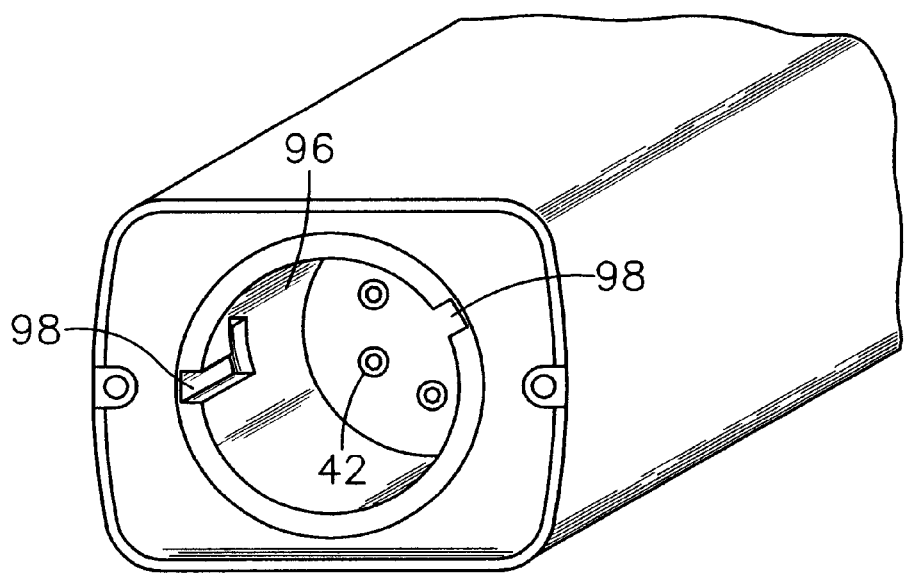
FIGS. 8a and 8b are pictorial representations of a preferred sensor socket.
Figure 8B:
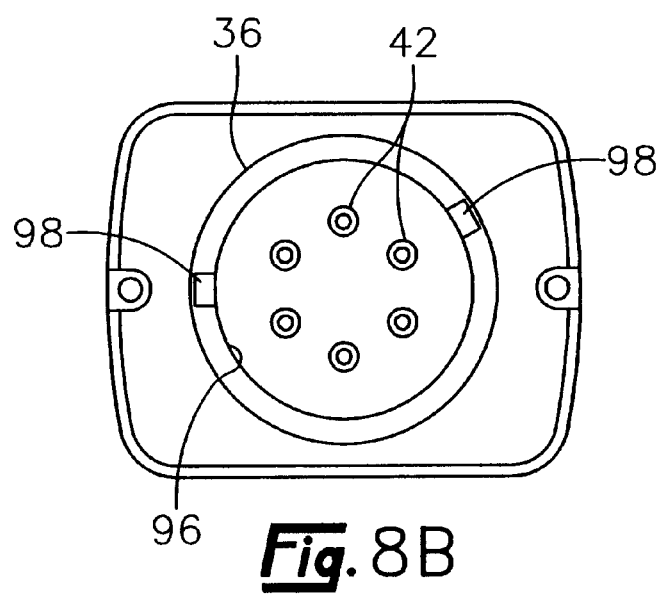

The sensor socket 36 is preferably designed to allow the ultrasonic monitoring system 10 to interchangeably use different types of sensors 22. As shown in FIGS. 8a and 8b, the sensor socket 36 preferably consists of a cylindrical chamber 96 for receiving the sensors 22 with a set of electrical contact pins 42 in the bottom of the cylindrical chamber 96 that are in electrical contact with corresponding contact pads 108 on a sensor 22 that has been installed in the sensor socket 36. In an especially preferred embodiment, six pins 42 in the sensor socket 36 electrically connect the sensor 22 to the ultrasonic monitoring device 10. Two of the pins 42 are used to send the received ultrasonic electric signals to the voltage controlled amplifier 76 of the heterodyning audio circuit and the received signal strength indicator 90. Two pins 42 are used to provide a power supply voltage and a power supply ground to the installed sensor 22. One of the pins 42 is used to provide a temperature reading to the temperature sense circuit 92 and, the last pin 42 is used to provide a communication line between the identification circuit 23 on the sensor and the microprocessor control circuit 78 in the elongate housing 24. It is understood that more electrical connections could be provided if necessary. Each of the pins 42 are spring biased and move axially to yieldably engage the contact pads 108.

The sensors 22 are held in the sensor socket 36 by a pair of protruding members 100 that are designed to be received by corresponding channels 98 in the walls of the cylindrical sensor socket 36. In an especially preferred embodiment, the channels 98 are L-shaped so that the sensor 22 is installed in the sensor socket 36 by inserting the protruding members 100 into the top of the L-shaped channels 98 and pushing the protruding members 100 down into the channels 98. The sensor is then twisted so that the protruding members 100 are securely contained in the leg of the L-shaped channels 98 and prevent the sensor 22 from being removed from the sensor socket 36. The process is remotely similar to placing a bayonet on the end of a rifle.

The sensor 22 can only be inserted into the sensor socket 36 with the protrusions 100 on the sensor 22 aligned with the grooves 98 in the socket 36. Because it is important that the contact pins 42 in the sensor socket 36 be aligned with the proper contact pads 108 of the sensor 22, the protruding members 100 are preferably positioned so that it is mechanically impossible to install the sensors 22 oriented in the wrong fashion. For example, if the protruding members 100 are placed directly across from each other, there are two possible ways to insert the sensor 22 into the socket 36. Therefore, the protruding members 100 are preferably positioned so that they are not directly across from one another. This insures that the contact pins 42 in the socket 36 are properly aligned with the contact pads 108 of the sensor 22. It is understood that a number of other mechanical means could be used to key the sensors 22 to help insure proper insertion, however, the aforementioned approach is easy to implement and quite effective.

A wide variety of ultrasonic sensors 22 can be installed in the sensor socket 36 depending upon the particular needs of the operator 20. While it is appreciated that there are numerous applications for an ultrasonic monitoring system 10, machinery monitoring and leak detection are the primary uses for the ultrasonic monitoring system 10 of the present invention. The frequency range of interest for these applications is approximately 20 to 100 kHz. Conventionally, 40 KHz has been used by several manufacturers of ultrasonic instruments as the primary frequency of interest. This is probably the best general purpose frequency range, as it is high enough to be above most loud low frequency machine vibrations yet not so high as to be severely attenuated at reasonable distances. It should be understood that the ultrasonic sound waves produced by machinery defects or leaks typically do not consist of a single tone or pitch. These sounds are broadband signals that consist of many different frequencies. It is the complex nature of the signals that allows a trained operator to distinguish between the heterodyned ultrasonic sounds produced by different conditions. For example, leaks in pressurized containers generally create a rushing sound while arcing and electrical corona typically produce a cracking or buzzing sound. In addition to differences in the sounds that can be audibly detected by listening to the heterodyned signal, a machine analyzer can analyze the frequency spectrums of the waveforms to detect signal spiking caused by bearing defects or other impact producing conditions. Because of the wide range of applications, it is understood that a variety of different sensors 22 designed to detect a range of different frequencies could be utilized in accordance with the present invention and the particular types of sensors 22 discussed are for illustration purposes only.

Two preferred types of ultrasonic sensors 22 that are utilized with the bayonet style locking system of the present invention are the airborne ultrasonic sensor 102, shown in FIGS. 9a, 9b, and 9c, and the contact ultrasonic sensor 104, shown in FIGS. 10a, 10b, 10c, and 10d. The preferred embodiments of both sensors 102 and 104 utilize piezoelectric transducers 25 to produce ultrasonic electrical signals that correspond to the ultrasonic sound waves reaching the sensors 102 and 104. The airborne sensor 102 preferably consist of a cylindrical housing 106 with a cylindrical PC board containing six contact pads 108 at one end that serves to establish electrical connections between the sensor 102 and the sensor socket 36. In addition, an identification circuit 23 and a piezoelectric transducer 25 are preferably located in the main body of the cylindrical housing 106. The piezoelectric transducer 25 is located behind a protective housing 110 in the end of the cylindrical housing 106 opposite the PC board containing the contact pads 108. The piezoelectric transducer 25 generates ultrasonic electrical signals in response to ultrasonic sound waves. The ultrasonic electrical signals are then split between two inputs on the cylindrical PC board containing the contact pads 108. The ultrasonic electrical signals are then sent from two of the contact pads on the cylindrical PC board 108 to the input of the received signal strength indicator 90 and the voltage controlled amplifier 76.

To allow the operator 20 to determine the precise location of small leaks or ultrasonic noise sources, a rubber cone 112 with a hole in the tip can be placed over the sensor 102 as shown in FIG. 11. The rubber cone diminishes the ability of the sensor 22 to detect ultrasonic sounds from anywhere but the open tip of the cone. Thus, the rubber cone 112 permits the operator 20 to more precisely locate a small leak. Materials other than rubber could be used to construct the cone 112, however, the rubber cone 112 does a particularly good job of isolating the ultrasonic sound waves and its flexibility makes it easy to use.

Because each sensor 22 contains identification information, variations in the airborne ultrasonic sensors 102 are easily accommodated by the ultrasonic monitoring system 10. New software can be installed in the ultrasonic monitoring system 10 that provides the system with the configuration information needed to accommodate the newly developed sensors 22.

The base of the contact sensor 104 is similar to the base of the airborne sensor 102. However, the receiving end of the contact sensor 104 consists of a long substantially hollow shaft 114. Ultrasonic vibrations are received by placing the tip hollow shaft 114 of the contact sensor 104 on the object that is suspected of radiating ultrasonic sound waves. To reinforce and stabilize the shaft 114 of the contact sensor 104, an adjustable washer 113, that is received by threads located on the cylindrical housing 106 at the base of the shaft 114, is tightened until the contact sensor 104 is firmly held in the sensor socket 36. A piezoelectric transducer 25 is located in the base of the shaft 114. Placing the tip of the shaft 114 against an object producing ultrasonic sound waves causes the piezoelectric transducer 25 of the contact sensor 104 to produce ultrasonic electrical signals. While the airborne ultrasonic sensor 102 is mechanically self-resonant, the contact sensor 104 is not. Therefore, the contact sensor 104 preferably contains an inductive and capacitive band pass resonant filter 27 that is preferably tuned to a frequency of 40 KHz. In a fashion similar to that of the airborne sensor 102, the ultrasonic electrical signal is then split and sent to the cylindrical shaped PC board containing the contact pads 108 that provide electrical contacts to the sensor socket contact pins 42.

The ultrasonic contact sensor 104 preferably contains a temperature sensor 116 coaxially mounted within the ultrasonic sensing shaft 114. The tip 117 of the temperature sensor 116 is constructed out of a material, such as copper, that rapidly conducts heat. A resistance type temperature detection circuit as shown in FIG. 10*d* is the preferred approach to determining the surface temperature of the object being monitored. A section of resistance temperature dependent (RTD) material 115 is in close contact with the heat conductive tip 117 of the temperature sensor 116. Thus, the heat conductive tip 117 acts as a conductor of heat between the surface of the object whose temperature is being measured and the RTD material 115. The resistance of an RTD material 115 varies relatively rapidly with a change in temperature. Thus, by measuring the resistance of the RTD material 115, a temperature measurement can be obtained. When the temperature sensor 116 is placed in contact with the surface for which a temperature reading is desired, the temperature of the tip 117 changes almost immediately to the temperature of the surface it is in contact with. The section of RTD material 115 is in close contact with the tip 117 and, thus, also rapidly changes temperature. In a preferred embodiment using copper for the heat conducting tip 117 and platinum as the RTD material 115, the temperature sensor 116 has a time constant response of less than 500 milliseconds.

A constant current is supplied to the RTD section of material 115 by the temperature sense circuit 92. As the temperature of the RTD section 115 of the temperature sensor 116 varies, so does the resistance of the RTD section 115. By supplying a constant current to the RTD material 115, a voltage potential is created across the material 115 that is proportional to the temperature of the sensor tip 117. As the temperature varies so does the resistance of the section of RTD 115 and, thus, the corresponding voltage potential also varies. By measuring the voltage potential across the section of RTD material 115 in the temperature sensor 116, the microprocessor 78 can determine the temperature of the tip 117 of the temperature sensor 116 and, thus, the surface temperature of the area in question.

Knowing the surface temperature of an enclosure containing bearings, gears, steam traps, valves, or other machinery provides an indication of the condition of the machinery. Temperature information is particularly useful when measurements are taken over time and compared. Many mechanical failures result in friction which, in turn, generates heat. Thus, a sudden increase in the surface temperature of a machine tends to indicate a new machinery defect is creating more friction and consequently more heat. A slow increase in surface temperature may indicate slowly progressing wear and tear in the machinery. As a further example of how surface temperature might be used to diagnose equipment failure, consider steam traps that are used to remove condensate from a steam line. Steam traps usually fail in one of two ways. First, they can fail open, meaning that they remove the condensate but allow steam to escape from the system. Second, they can fail closed, meaning that the pipes become blocked so that no condensate is removed. The temperature of the exhaust line of a steam trap which has failed open will be very high. Conversely, if the steam trap is blocked, the temperature of the downstream pipes will be much lower. Therefore, comparing the known temperature of a steam trap or machine when it is functioning properly to its present temperature can provide clues to the device's current condition.

Figure 12:
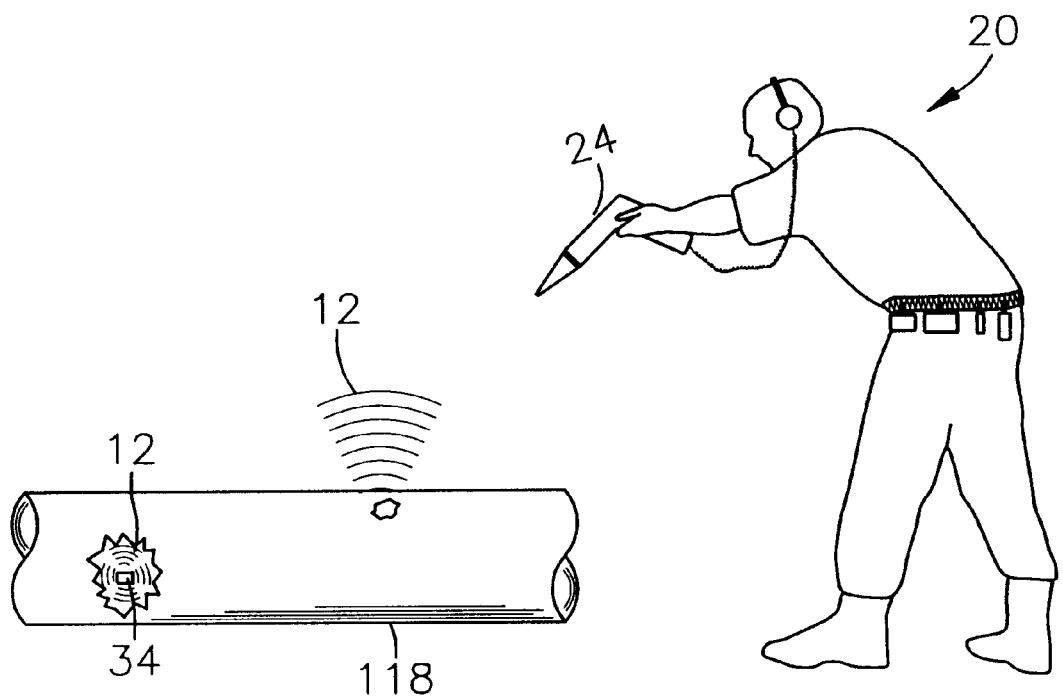
FIG. 12 is a pictorial representation of a method for using the ultrasonic transmitter to locate a hole in a pipe.

The ultrasonic monitoring system 10 further includes an ultrasonic sound wave transmitter 34 that permits the ultrasonic monitoring system 10 to locate holes in containers that are not producing ultrasonic sound waves. The ultrasonic sound wave transmitter 34 is turned on and placed inside a pipe, tank, or other sealed environment that it is desired to check for leaks. For example, as shown in FIG. 12, the ultrasonic sound wave transmitter 34 can be placed in a sealed environment 118. Once the ultrasonic sound wave transmitter 34 is activated, the operator 20 of the ultrasonic monitoring system 10 can use the ultrasonic sensor 22 in the elongate housing 24 to detect any ultrasonic sound waves 12 being emitted from the ultrasonic sound wave transmitter 34 that are escaping the sealed environment 118.

One of the primary benefits of using a digitally based ultrasonic monitoring system 10 that produces referenced decibel signal strength readings is the ability to store previously acquired data for later recall and analysis. Trending this digitally stored information allows the ultrasonic monitoring system 10 to detect changes in a machine's performance over time. For example, if the level of ultrasonic noise emitted by a particular machine dramatically increases from one week to another, it is highly likely that a machine defect has appeared or worsened in the previous week. In a similar vein, if a machine has consistently produced a large amount of ultrasonic noise over an extended period of time without malfunctioning, it is unlikely that another reading indicating the machine is producing a large amount of ultrasonic noise is indicative of a problem. Thus, much of the ultrasonic data acquired by the ultrasonic monitoring system 10 is primarily useful when compared to prior data collected under similar circumstances.

Temperature readings are also much more informative when trended over a period of time. For example, a surface temperature reading of 180 degrees Fahrenheit may not be particularly revealing in and of itself. However, a series of 120 degree Fahrenheit readings followed by a 180 degree reading is much more likely to be indicative of a problem. Thus, trending the data acquired by the ultrasonic monitoring system 10 dramatically improves the likelihood of detecting machinery defects.

Figure 13:
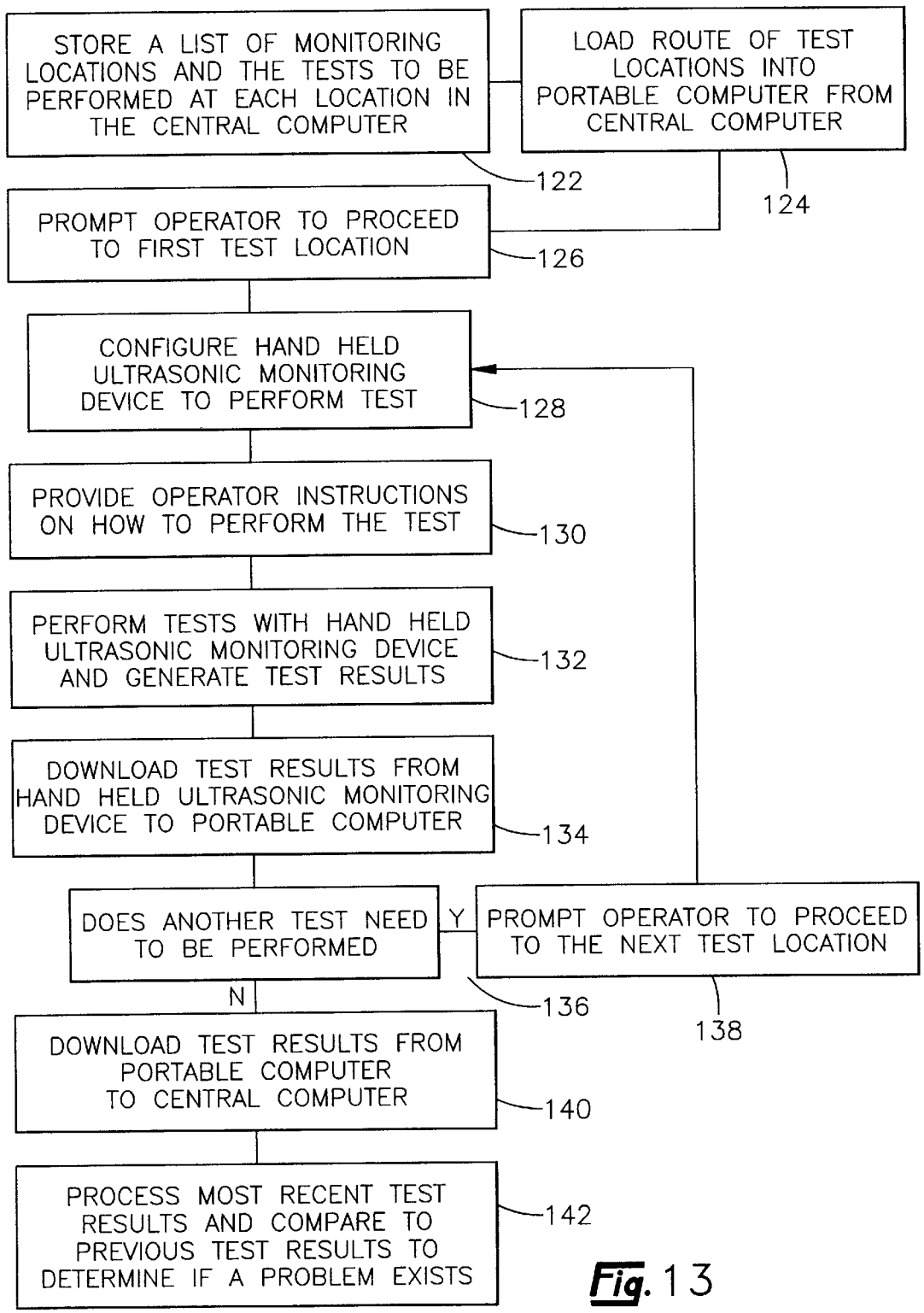
FIG. 13 is a flow chart outlining a route based method of monitoring equipment using the present invention.

As briefly mentioned before, the ultrasonic analysis system 10 preferably includes a microprocessor based portable personal computer. FIG. 13 is a flow chart showing the steps of a route based method of monitoring a series of machines with the ultrasonic monitoring system 10 of the present invention. The route based method uses a central processing and storage computer, a portable computer, and a hand held ultrasonic monitoring device. To set up a trendable ultrasonic monitoring system 10, a brief description of, and the location of, every machine that is to be monitored with the ultrasonic monitoring system 10 is entered into a central processing and storage computer. This step is shown in block 122 of FIG. 13. A monitoring schedule detailing the times at which each machine should be tested and the tests that should be performed on each machine is also programmed into the central processing computer. In a preferred embodiment, a ten character identification code is used to represent each machine and a three character identification code is used to represent each machine's location. When the time for testing the machines arrives, the central computer prompts the operator to download the testing information from the central computer to the portable computer, as shown in block 124. The portable computer examines the testing information and prompts the operator to proceed to the first testing location in block 126. The method then proceeds to block 128 wherein the portable computer loads the testing information needed for the first test into the hand held ultrasonic monitoring device. This testing information includes any configuration data needed for the particular tests to be performed on the machine. Furthermore, the alarm levels for the particular machine being tested are automatically sent from the portable computer to the hand held ultrasonic monitoring device. Thus, the portable computer prompts the operator to go to a particular location and perform a particular test on a particular machine and configures the microprocessor control unit in the hand held ultrasonic monitoring device to correctly perform the test. Furthermore, as shown in block 130, the portable computer provides a detailed description of how to perform the tests to the operator. It is important that the tests be performed in the same manner each time so that the results of the current test can be accurately compared to the results of previous tests. Once the ultrasonic sound wave and temperature measurements have been taken by the operator in block 132, the test results are downloaded from the hand held ultrasonic device to the portable computer in block 134. In decisional block 136, the portable computer must determine whether another test needs to be performed. If another test needs to be performed, the portable computer prompts the operator to proceed to the next test location and the method returns to block 128. The software running on the portable computer is preferably flexible enough to auto increment through a predetermined monitoring route or receive external inputs, such as bar code information, which dictate the location in the manufacturing setting to be monitored. However, when all the required tests have been performed, the portable computer prompts the operator to download the test results from the portable computer to the central computer. In the final step of the method depicted in block 142, the central computer compares the test data from the most recent test to the data from previous tests to determine the condition of the machines being monitored.

The test results from previous measurements may be used to generate alarm levels for the next series of measurements. For example, an alarm level can be set so that if the ultrasonic noise level measurement from a particular machine is three decibels higher than the previous the ultrasonic noise level measurement an alarm is triggered. The increase in ultrasonic noise from one measurement to the next that is necessary to trigger an alarm may be varied by the operator depending upon the particular type of machine being monitored and the circumstances surrounding its monitoring. Similarly, the current test results may be automatically compared to predetermined criteria stored in memory to determine if an alarm situation exists. The predetermined criteria may be based upon historical or baseline data corresponding to past measurements taken from a particular type machine. In addition, even more complex criteria such as the expected ultrasonic sound wave production of a particular machine as a function of the amount of time the machine has been operating are easily accommodated by the route based system of the present invention.

Depending upon the memory requirements imposed by the number of devices being monitored and the number of tests being performed, the data contained in the portable computer may not need to be downloaded to a permanent base station. If the storage and processing capacity of a central computer is not required, the test data may be stored and analyzed by the portable computer. Furthermore, if sufficient memory exists in the hand held ultrasonic monitoring device, the hand held ultrasonic monitoring device can perform the steps necessary for a route based monitoring system.

Storing the ultrasonic electrical signals received from particular machines also improves the likelihood of detecting a machinery defect by listening to the heterodyned audio signals produced by the ultrasonic monitoring system 10. Before the operator of the ultrasonic monitoring system 10 listens to the current audio signals produced in response to the ultrasonic sound waves received from a particular machine, the operator can prompt the portable computer to playback the audio signals previously recorded from the particular machine. This makes it much easier for the operator of the ultrasonic monitoring system 10 to detect the small changes in the audio signals which are often indicative of a developing machinery defect.

The ultrasonic monitoring system 10 allows a user to input a number of conditions that will result in an alarm being generated. These alarms may be audible or visual depending on the user's preference. These alarms preferably include an alarm for exceeding a user-defined decibel level, an alarm for exceeding a user-defined temperature level, and an alarm to alert the user that the incoming signal is beginning to be clipped by the internal electronic circuitry in the elongate housing 24.

The decibel alarm is defined by accessing the alarm function with the mode input key 72 on the elongate housing 24 and using the up 70 and down 68 arrow input keys to set an alarm limit. Preferably, when the alarm level is reached, an audible alarm is heard in the headphones 26 and the referenced decibel readout on the display 66 flashes. The alarm limit may be triggered differently depending on which operating mode is selected. For example, in the instantaneous, peak hold and peak factor modes, the decibel alarm is preferably activated the first time the incoming signal reaches the user defined limit. However, when in the average mode, the decibel alarm is activated the first time the average reading reaches the user-defined limit.

The temperature alarm is also defined by accessing the temperature alarm function with the mode input key 72 and using the up 70 and down 68 and arrow keys to set the alarm limit.

When the limit is reached, an audible alert is heard in the headphones 26 and the temperature readout on the display 66 flashes. The signal clipping alarm indicates the incoming signal is being clipped and that the user should decrease the volume. The signal clipping alarm can be either an audible alarm in the headphones 26 or a visual alarm on the display 66.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A route based method of locating mechanical defects, electrical anomalies or leaks producing ultrasonic sound, the steps of the method comprising:

storing a set of instructions including at least a set of measurement locations for performing a series of airborne ultrasonic sound measurements;

directing an operator along a route that includes the measurement locations;

prompting the operator to perform the series of airborne ultrasonic sound measurements along the route of measurement locations;

sensing airborne ultrasonic sound with a non-contact airborne ultrasonic sensor; producing sensed ultrasonic electrical signals corresponding to the sensed airborne ultrasonic sounds;

producing audible frequency electrical signals derived from the sensed ultrasonic electrical signals;

using the audible frequency electrical signals to produce an audible sound that is related to airborne ultrasonic sound sensed at a location;

locating any mechanical defect, electrical anomaly or leak producing airborne ultrasonic sound in the location based upon at least one of said audible frequency electrical signals and said sensed ultrasonic electrical signals; and prompting the operator to record information corresponding to said airborne ultrasonic sound from any mechanical defect, electrical anomaly or leak located.

2. The method of claim 1 further comprising:

using the audible frequency electrical signals to produce an audible sound that is related to ultrasonic sound measured at a measurement point;

providing and storing a set of notes describing characteristics of the audible sound; and prompting the operator to select a note that describes a characteristic of the audible sound; and storing the selected note.

3. The method of claim 1 further comprising the step of comparing the set of results from the series of ultrasonic sound measurements to a set of results from a previous series of ultrasonic sound measurements along the route of measurement locations in order to determine if any trends in the set of results from the series of ultrasonic measurements exist.

4. The method of claim 1 further comprising the step of providing a set of alarm levels for the series of ultrasonic sound measurements.

5. The method of claim 1 further comprising the step of analyzing the set of results to determine if a machinery defect or leak is present.

6. The method of claim 1 further comprising the step of assigning each measurement location in the route of measurement locations an identification code.

7. The method of claim 1 further comprising visually displaying the results of the series of ultrasonic sound measurements to the operator.

8. The method of claim 1 wherein the step of performing the series of ultrasonic sound measurements further includes taking temperature measurements.

9. The method of claim 1 wherein the step of directing an operator along a route of measurement locations further includes providing the operator the location of the next test to perform.

10. The method of claim 1 wherein the step of prompting the operator to perform a series of ultrasonic sound measurements further includes providing the operator information concerning the type of measurements to be taken and the manner in which the measurements should be taken.

11. A route based method of monitoring and locating equipment failures such as leaks, electrical anomalies or machinery defects that produce airborne ultrasonic sound waves, the steps of the method comprising:

storing test information concerning the type and location of ultrasonic tests to perform in a centrally based storage system;

loading a portion of the test information into a portable testing device;

prompting an operator to perform an airborne ultrasonic test that generates test results with the portable testing device;

storing the test results in the portable testing device;

transferring the test results from the portable testing device to a centrally based storage system; and determining whether to perform another airborne ultrasonic test based on previous test results.

12. The method of claim 11 further comprising the step of diagnosing equipment failures by comparing the test results of a most recent test to the test results of a previous test.

13. The method of claim 11 further comprising performing a series of tests on a particular piece of equipment over a period of time to obtain a series of test results and identifying trends in the series of test results that indicate a potential equipment failure.

14. The method of claim 11 wherein the step of loading a portion of the test information into a portable testing device further comprises loading configuration information and alarm levels into the portable testing device.

15. The method of claim 14 further comprising the step of calculating the alarm levels for a piece of equipment based on test results received from a prior test performed on the piece of equipment.

16. The method of claim 11 further comprising the step of determining when to perform another test on a piece of equipment based on the previous results of tests performed on the piece of equipment.

17. The method of claim 11 wherein the step of prompting the operator to perform a test further comprises providing the operator information concerning the manner in which the test should be performed.

18. The method of claim 11 wherein the step of loading test information into the portable testing device further includes loading configuration information into the portable testing device.

19. A method of monitoring the condition of a plurality of pieces of equipment producing ultrasonic sounds, the steps of the method comprising:

storing a set of predetermined criteria in a digital memory that correspond to acceptable operating conditions of the plurality of pieces of equipment;

performing a set of contact ultrasonic sound measurements on the plurality of pieces of equipment at a plurality of measurement points to obtain a set of ultrasonic test data;

sensing airborne ultrasonic sound at designated locations to locate any mechanical defects, electrical anomalies or leaks producing airborne ultrasonic sound;

storing the set of ultrasonic test data corresponding to the set of ultrasonic sound measurements and the location of any detected mechanical defects, electrical anomalies or leaks in a digital memory; and comparing the set of ultrasonic test data to the set of predetermined criteria to determine whether additional tests are required.

20. The method of claim 19 wherein the set of predetermined criteria comprises a set of historical and baseline data corresponding to results of past ultrasonic sound measurements.

21. The method of claim 19 further comprising the step of measuring and recording a temperature of a piece of equipment in the plurality of pieces of equipment at a first time and a second time and comparing the temperature at the first time to the temperature at the second time to determine the condition of the equipment.

22. The method of claim 19 further comprising determining a temperature alarm level at which a temperature alarm will be generated and generating a temperature alarm when the temperature alarm level is exceeded.

23. The method of claim 22 wherein the temperature alarm level is based on a previous temperature that was measured and recorded for the piece of equipment.

24. The method of claim 19 further comprising the step of generating ultrasonic alarm levels for a piece of equipment and producing an ultrasonic alarm signal when the ultrasonic sound produced by the piece of equipment exceeds the ultrasonic alarm levels.

25. The method of claim 24 wherein the ultrasonic alarm levels are generated based on the amount of ultrasonic sound previously measured and recorded for a piece of machinery.

26. The method of claim 19 further comprising the step of compiling a list of the location of each piece of equipment to be monitored and the times at which the piece of equipment should be monitored and prompting an operator to monitor the pieces of equipment at the appropriate times.

27. A route based method for ultrasonically monitoring a mechanical system, the steps of the method comprising:

creating a route that contains the location of each machine, device, or area to be tested and the tests to be performed on each machine, device, or area, storing the route in a central processing location;

assigning each machine to be ultrasonically monitored and each measurement to be taken an identification code and storing the identification code for later reference;

determining alarm levels for each ultrasonic measurement to be taken;

loading a route of the ultrasonic tests to be performed, the alarm levels for each measurement and the configuration information needed to perform the route of ultrasonic tests into a portable processing and storage unit from a central processing location;

loading a list of locations at which to sense airborne ultrasonic sounds into the portable processing and storage unit from the central processing location;

prompting an operator of the portable processing and storage unit to perform a first ultrasonic test with a portable sensing device and the portable processing and storage unit;

providing the configuration information related to the performance of the particular ultrasonic test including the alarm levels for the ultrasonic test from the portable storage and processing unit to the portable sensing means;

performing the ultrasonic test with the portable sensing device by sensing at least ultrasonic sound and obtaining test results;

downloading the ultrasonic test results from the portable sensing device to the portable processing and storage unit;

prompting the operator to perform the next ultrasonic test indicated by the portable processing and storage device;

continuing to perform the ultrasonic tests indicated by the portable processing and storage device in the manner described above until all of the ultrasonic tests on the route of ultrasonic tests have been performed;

transferring the ultrasonic test results stored in the portable processing and storage unit to the central processing station and storing the ultrasonic test results in the central processing station; and comparing the ultrasonic test results from the most current set of measurements to the stored ultrasonic test results from previous measurements to determine if any trends in the data indicate a condition that warrants performing additional ultrasonic tests.

28. An ultrasonic monitoring apparatus for ultrasonically monitoring a route of machines, devices or areas comprising:

portable ultrasonic sound sensing means having an ultrasonic sensor for sensing at least the amplitude of airborne ultrasonic sound produced by machines in the route of machines;

temperature sensing means for taking temperature readings along the route of machines;

portable processing and storage means for storing the location of the machines in the route of machines, storing and providing configuration and test information concerning the tests to be performed on each machine, device, or area in the route of machines, prompting the operator of the ultrasonic monitoring apparatus to perform a particular test, and receiving test results from the portable ultrasonic sound sensing means;

display means for visually providing testing information to an operator of the apparatus concerning tests to be performed and the results the tests; and audible indication means for audibly providing testing information to the operator of the apparatus concerning at least the results of the most recent test performed.

29. The apparatus of claim 28 further comprising a central computer for receiving and storing the test results from the portable processing and storage means and analyzing the test results to determine if a machine in the route of machines has a machine defect.

30. The apparatus of claim 29 wherein the central computer further comprises processing means for comparing the test results from the most current set of tests to the test results from previous tests to determine if trends in the test results indicate the presence of a machine defect.

* * * * *